United States Patent
Komati et al.

(10) Patent No.: US 10,149,246 B2
(45) Date of Patent: Dec. 4, 2018

(54) SELECTIVE USE OF ANTENNA DIVERSITY IN MTC DEVICES

(71) Applicant: QUALCOMM Incorporated, San Diego, CA (US)

(72) Inventors: Vamsi Krishna Chaitanya Komati, Hyderabad (IN); Bhaskara Viswanadham Batchu, Ameenpur Village (IN); Raghu Movva, Hyderabad (IN)

(73) Assignee: QUALCOMM Incoporpated, San Diego, CA (US)

( * ) Notice: Subject to any disclaimer, the term of this patent is extended or adjusted under 35 U.S.C. 154(b) by 167 days.

(21) Appl. No.: 15/212,923

(22) Filed: Jul. 18, 2016

(65) Prior Publication Data
US 2018/0020403 A1    Jan. 18, 2018

(51) Int. Cl.
| | |
|---|---|
| H04W 52/02 | (2009.01) |
| H04W 72/04 | (2009.01) |
| H04W 72/02 | (2009.01) |
| H04W 4/70 | (2018.01) |
| H04B 7/08 | (2006.01) |
| H04B 7/00 | (2006.01) |
| H04B 7/06 | (2006.01) |

(52) U.S. Cl.
CPC ........ *H04W 52/0229* (2013.01); *H04B 7/002* (2013.01); *H04B 7/0608* (2013.01); *H04B 7/0822* (2013.01); *H04B 7/0871* (2013.01); *H04W 4/70* (2018.02); *H04W 72/02* (2013.01); *H04W 72/048* (2013.01); *H04W 72/0446* (2013.01); *H04B 7/0817* (2013.01); *Y02D 70/00* (2018.01)

(58) Field of Classification Search
CPC ... H04W 72/042; H04W 4/005; H04W 24/10; H04W 72/0446; H04W 24/08; H04W 88/02; H04W 28/06; H04W 72/0413
USPC ......................................................... 370/311
See application file for complete search history.

(56) References Cited

U.S. PATENT DOCUMENTS

| | | | | |
|---|---|---|---|---|
| 5,913,177 A | * | 6/1999 | Meredith | ............... H04W 16/28 455/272 |
| 7,929,985 B2 | | 4/2011 | Khayrallah et al. | |
| 8,682,256 B2 | | 3/2014 | Zimmermann et al. | |

(Continued)

FOREIGN PATENT DOCUMENTS

EP    1482658 A2    12/2004

OTHER PUBLICATIONS

International Search Report and Written Opinion—PCT/US2017/037767—ISA/EPO—dated Sep. 7, 2017.

*Primary Examiner* — Natasha W Cosme
(74) *Attorney, Agent, or Firm* — Paradice and Li LLP

(57) ABSTRACT

A wireless device includes a first antenna and a second antenna that may be used to communicate with a wireless network. The wireless device initiates a traffic call with a wireless network and activates a first antenna to be used to communicate with the wireless network upon initiating the traffic call. The wireless device selectively activates a second antenna, when initiating the traffic call, based at least in part on a usage of the second antenna during a previous traffic call. For example, the wireless device may maintain the second antenna in an inactive state if the second antenna was deactivated during the previous traffic call and/or remained inactive for at least a threshold duration.

28 Claims, 9 Drawing Sheets

(56) References Cited

U.S. PATENT DOCUMENTS

| | | |
|---|---|---|
| 8,761,701 B2 | 6/2014 | Ramasamy et al. |
| 9,048,913 B2 | 6/2015 | Kludt et al. |
| 2005/0186921 A1 | 8/2005 | Hoo et al. |
| 2012/0142296 A1 | 6/2012 | Cotterill et al. |
| 2012/0282982 A1* | 11/2012 | Mujtaba ............... H04B 7/0814 |
| | | 455/574 |
| 2013/0244665 A1 | 9/2013 | Clevorn et al. |
| 2016/0088512 A1* | 3/2016 | Bergstrom ........ H04W 28/0263 |
| | | 370/330 |

* cited by examiner

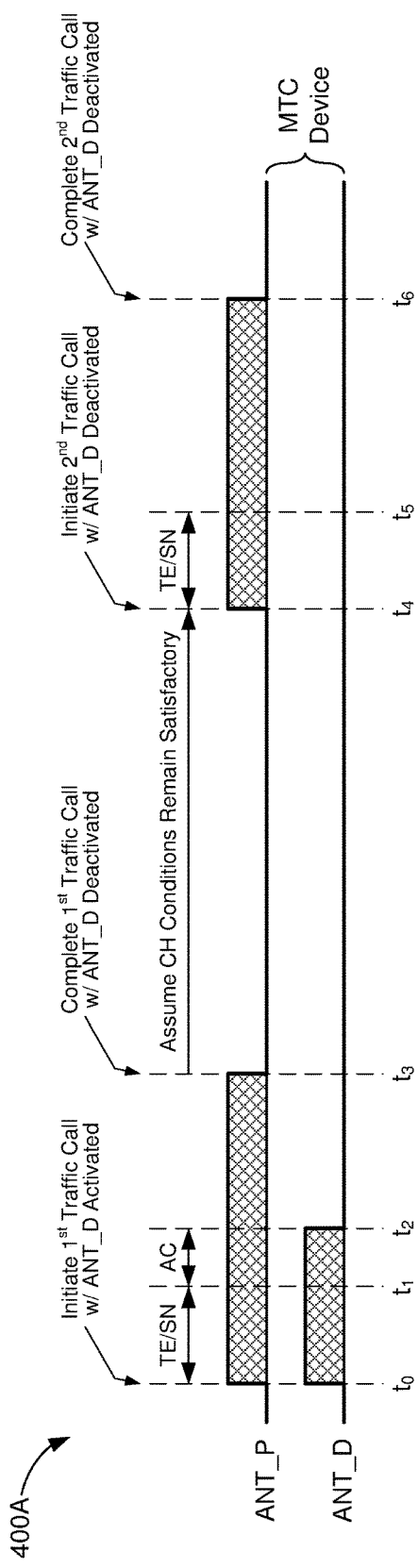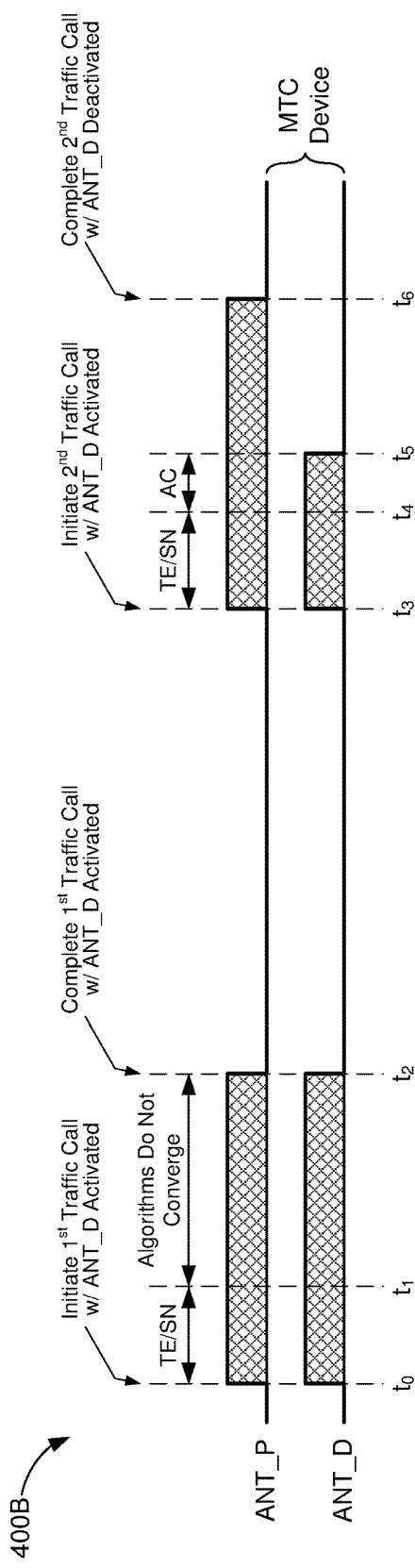
FIG. 4A
FIG. 4B

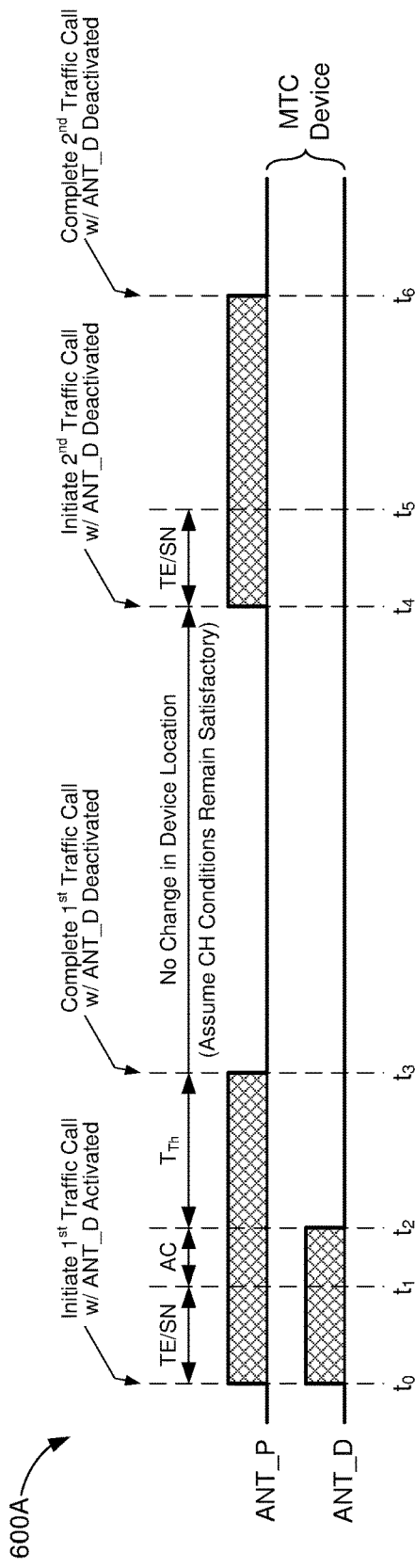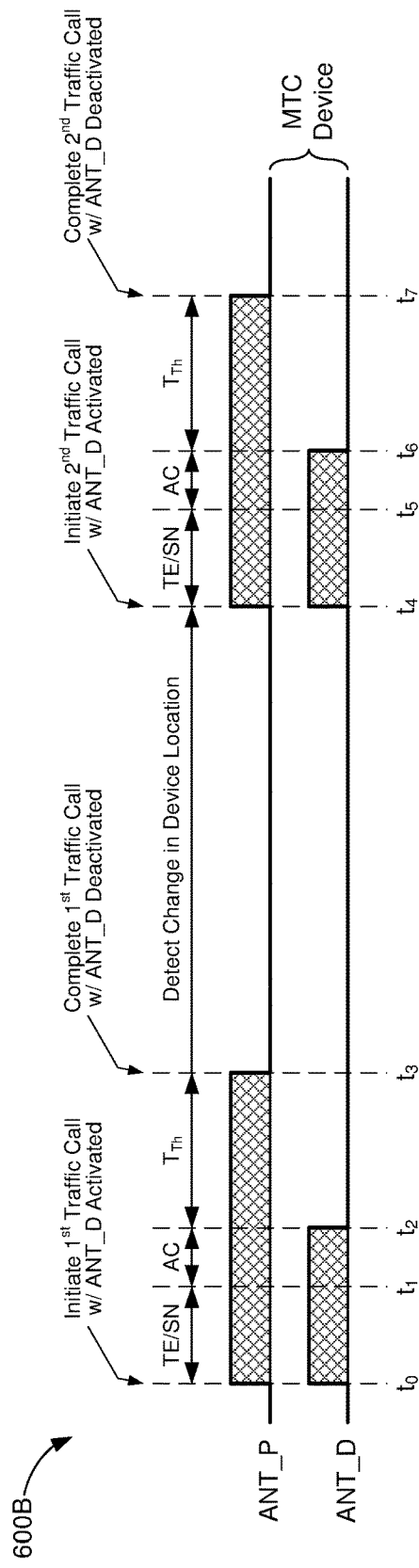

SELECTIVE USE OF ANTENNA DIVERSITY IN MTC DEVICES

TECHNICAL FIELD

The example embodiments relate generally to machine-type communication (MTC) devices, and specifically to a selective use of antenna diversity in MTC devices.

BACKGROUND OF RELATED ART

The Internet of Things (IoT) is a technology that enables interconnectivity to a broad spectrum of devices and objects. Certain devices in an IoT network may provide key services (e.g., connectivity, authentication, configuration/admission control, etc.) to other devices in the network. For example, IoT networks typically operate in an "infrastructure mode" for which a wireless hub (e.g., access point and/or base station) provides a shared wireless communication medium for use by a number of client devices. A significant portion of an IoT network may be used for machine-to-machine (M2M) communications, which occur between machines or devices (e.g., machine-type communication (MTC) devices) with little or no human interaction.

A typical MTC device may have a primary antenna and at least one diversity antenna that may be used to improve the quality and/or reliability of wireless communications. The diversity antenna is typically activated each time an MTC device initiates a "traffic call" to send and/or receive data traffic over the network. However, using the diversity antenna increases power consumption (e.g., compared to using only the primary antenna). Thus, the diversity antenna may be subsequently deactivated (e.g., during the traffic call) if the MTC device determines that the channel conditions are sufficient or adequate to facilitate communications using only the primary antenna.

MTC devices are often battery-operated and tend to be highly power sensitive. Thus, it would be desirable to reduce the power consumption of MTC devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus are disclosed that reduce power consumption in wireless devices by selectively activating one or more diversity antennas of the wireless device based at least in part on prior usage and/or activity of the diversity antennas. The wireless device (e.g., a machine-type communication (MTC) device) initiates a traffic call with a wireless network, and activates a first antenna to be used to communicate with the wireless network upon initiating the traffic call. Further, the wireless device may selectively activate a second antenna, when initiating the traffic call, based at least in part on a usage of the second antenna during a previous traffic call.

The wireless device may activate the second antenna if the prior usage of the second antenna suggests or indicates relatively poor or unreliable channel conditions in the wireless network. For example, the wireless device may activate the second antenna if the second antenna was active during the previous traffic call for at least a threshold duration. Upon activating the second antenna, the wireless device may communicate with the wireless network using the first antenna and the second antenna, concurrently, during the traffic call.

The wireless device may not activate the second antenna if the prior usage of the second antenna suggests or indicates relatively good channel conditions in the wireless network. For example, the wireless device may maintain the second antenna in an inactive state if the second antenna was never activated during the previous traffic call. Further, the wireless device may maintain the second antenna in an inactive state if the second antenna was deactivated during the previous call and/or remained inactive for the remainder of the previous traffic call. Alternatively, or in addition, the wireless device may maintain the second antenna in an inactive state if the second antenna was inactive during the previous traffic call for at least a threshold duration.

Still further, the wireless device may selectively activate the second antenna based on a location and/or movement of the wireless device. For example, the wireless device may determine its location, and may activate the second antenna if the location of the wireless device changed between the traffic call and the previous traffic call.

BRIEF DESCRIPTION OF THE DRAWINGS

The example embodiments are illustrated by way of example and are not intended to be limited by the figures of the accompanying drawings. Like numbers reference like elements throughout the drawings and specification.

FIGS. 4A and 4B show timing diagrams depicting traffic call operations for which an MTC device may selectively activate its diversity antenna based at least in part on prior usage of the diversity antenna, in accordance with example embodiments.

FIGS. 6A and 6B show timing diagrams depicting traffic call operations for which an MTC device may selectively activate its diversity antenna based at least in part on a location of the MTC device, in accordance with example embodiments.

DETAILED DESCRIPTION

Figure 1:
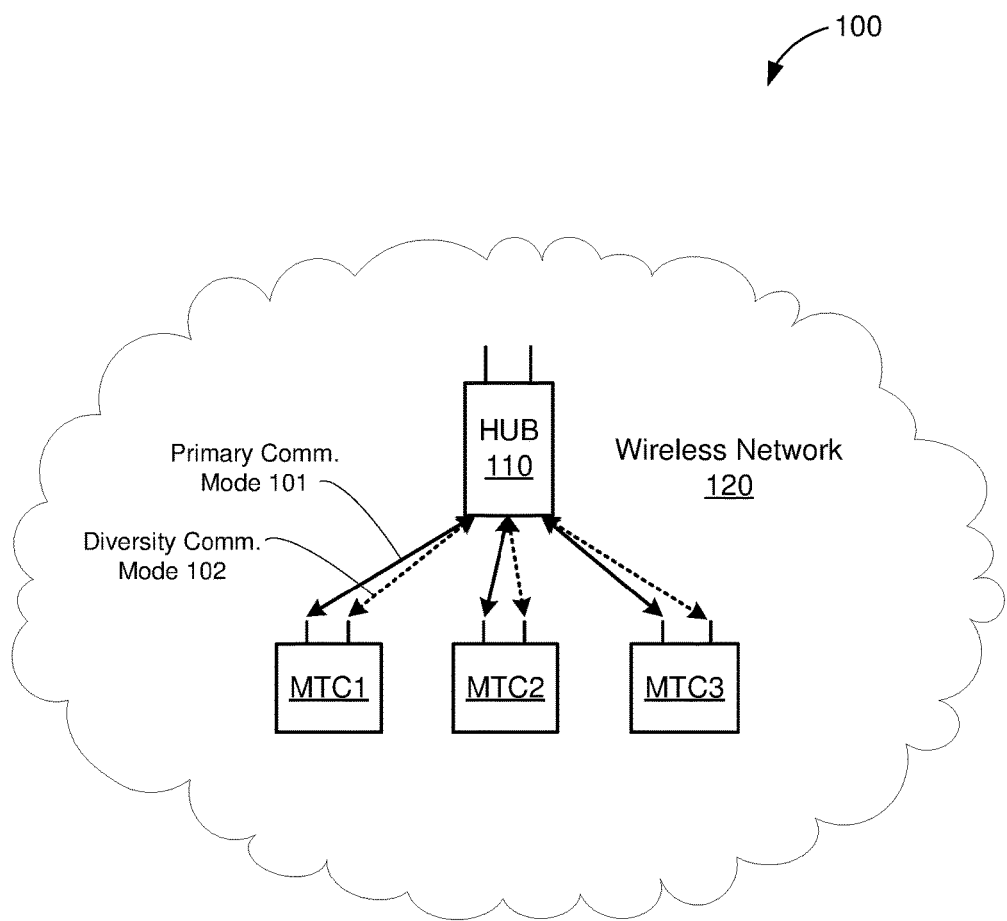
FIG. 1 shows an example wireless communications system within which the example embodiments may be implemented.

The example embodiments are described below in the context of machine-type communication (MTC) devices for simplicity only. It is to be understood that the example embodiments are equally applicable to other wireless devices (e.g., mobile phones, tablets, computers, etc.), as well as for devices using signals of one or more wired standards or protocols (e.g., Ethernet and/or HomePlug/PLC standards). As used herein, the term "wireless network" may include communications governed by the IEEE 802.11 family of standards, BLUETOOTH® (Bluetooth), HiperLAN (a set of wireless standards, comparable to the IEEE 802.11 standards, used primarily in Europe), and various cellular communication standards (e.g., 4G Long Term Evolution (LTE), third generation of mobile communications technology (3G), Global System for Mobile Communications (GSM), etc.). In some implementations, a wireless network may include communications governed by two or more wireless communication standards.

In the following description, numerous specific details are set forth such as examples of specific components, circuits, and processes to provide a thorough understanding of the present disclosure. The term "coupled" as used herein means connected directly to or connected through one or more intervening components or circuits. Further, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example wireless communications devices may include components other than those shown, including well-known components such as a processor, memory and the like The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

FIG. 1 shows an example wireless communications system 100 within which the example embodiments may be implemented. The system 100 is shown to include a wireless hub 110, a wireless network 120, and a number of client devices MTC1-MTC3. The wireless network 120 may be formed by a plurality of wireless hubs that may operate according to one or more wireless communication standards (e.g., including Bluetooth, LTE, 3G, GSM, or any of the IEEE 802.11 family of standards). Thus, although only one wireless hub 110 is shown in FIG. 1 for simplicity, it is to be understood that the wireless network 120 may be formed by any number of wireless hubs (e.g., base stations and/or access points) such as wireless hub 110.

The wireless hub 110 may be any suitable device that allows one or more wireless devices to connect to a network (e.g., a cellular network, a local area network (LAN), a wide area network (WAN), metropolitan area network (MAN), and/or the Internet) via the corresponding hub using LTE, 3G, GSM, Wi-Fi, Bluetooth, or any other suitable wireless communication standards. For example, the wireless hub 110 may be a base station, an access point, or a combination of both. For some embodiments, the wireless hub 110 may also be any suitable wireless device (e.g., such as a wireless station) acting as a software-enabled access point ("SoftAP"). For at least one embodiment, the wireless hub 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for communicating with the other devices (e.g., client devices and/or wireless hubs) in the wireless network 120.

Each of the client devices MTC1-MTC3 may be any suitable wireless communication device such as, for example, a cell phone, personal digital assistant (PDA), tablet device, laptop computer, or the like. In example embodiments, one or more of the client devices MTC1-MTC3 may be a machine-type communication (MTC) device configured to operate with limited (if any) human interaction. Examples of MTC devices may include smart meters, security alarms, home appliances, health tracking devices, and the like. For at least some embodiments, each of the client devices MTC1-MTC3 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 7-9.

For the wireless hub 110 and client devices MTC1-MTC3, the one or more transceivers may include Wi-Fi transceivers, Bluetooth transceivers, NFC transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 standards. The cellular transceiver may communicate with various RF frequency bands in accordance with the LTE standard (e.g., between approximately 700 MHz and approximately 3.9 GHz) and/or in accordance with other cellular protocols (e.g., 3G, GSM, etc.). In other embodiments, the transceivers may be any technically feasible transceiver such as a ZigBee transceiver described by the ZigBee specification, WiGig transceiver, and/or a HomePlug transceiver described in one or more standards provided by the HomePlug Alliance.

In example embodiments, each of the client devices MTC1-MTC3 may include at least a primary antenna and a diversity antenna. Any data traffic to and/or from a particular client device is communicated using at least the primary antenna. For example, when operating in a primary communication mode 101, the client device may use only its primary antenna to transmit and/or receive wireless signals in the wireless network 120. The diversity antenna may be used to improve signal quality and/or throughput of communications for the particular client device (e.g., under poor or unreliable channel conditions). More specifically, when operating in a diversity communication mode 102, the client device may use the primary antenna and the diversity antenna, concurrently, to transmit and/or receive wireless signals in the wireless network 120.

As described above, the client devices MTC1-MTC3 may be MTC devices (e.g., smart meters, security alarms, home appliances, etc.) that communicate infrequently with the wireless hub 110 and/or wireless network 120. For example, the client devices MTC1-MTC3 may be battery-operated devices that remain idle for relatively long periods of time between bursts of data traffic (e.g., to conserve energy). Thus, each of the client devices MTC1-MTC3 may periodically wake up from a low-power idle state to initiate a "traffic call" with the wireless hub 110. During the traffic call, a client device may transmit and/or receive data traffic via the wireless network 120.

Figure 2:
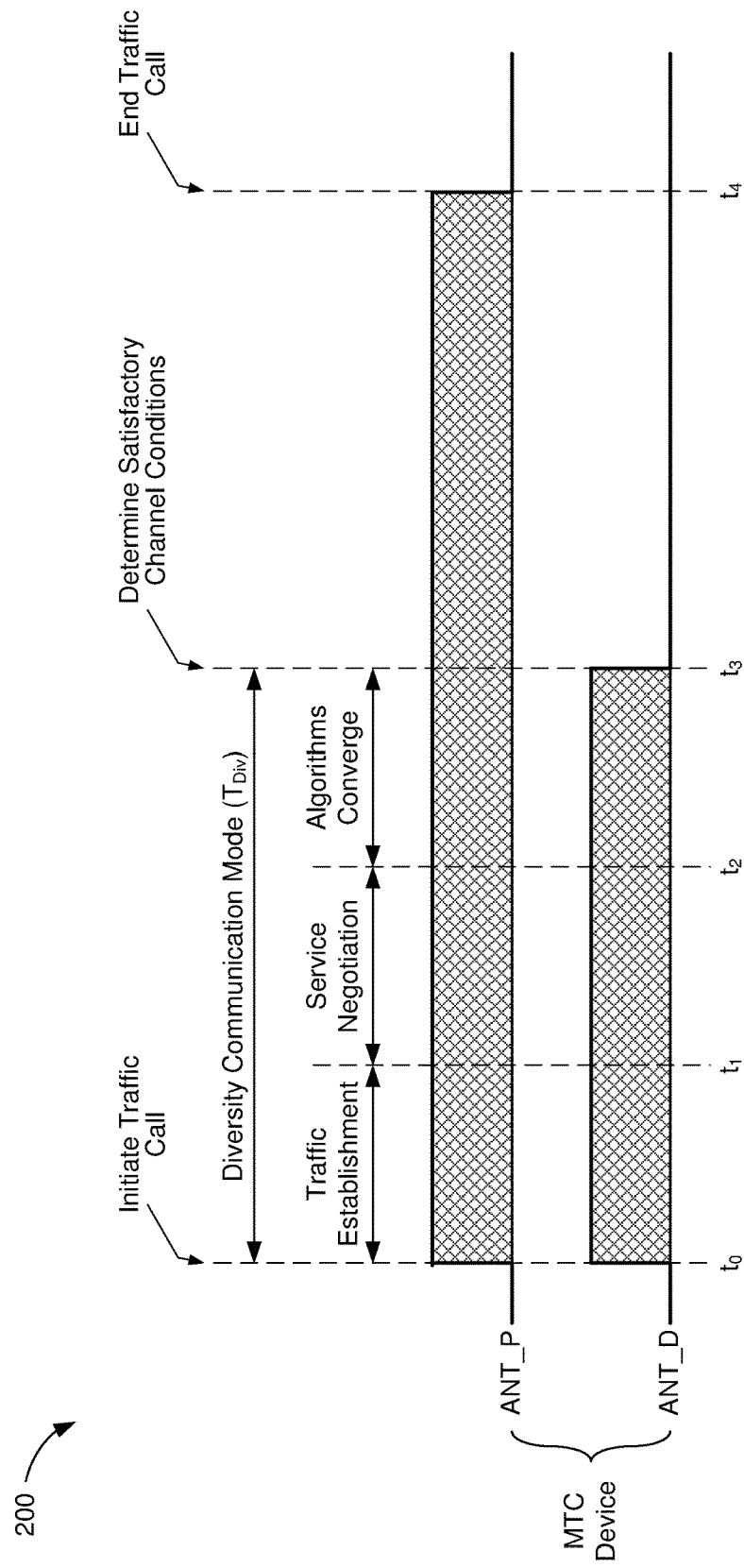
FIG. 2 shows a timing diagram depicting an example traffic call operation that may be performed by a machine-type communication (MTC) device having at least a primary antenna and a diversity antenna.

FIG. 2 shows a timing diagram 200 depicting an example traffic call operation that may be performed by an MTC device having at least a primary antenna (ANT_P) and a diversity antenna (ANT_D). For purposes of discussion herein, the MTC device represented in FIG. 2 may be any one of the client devices MTC1-MTC3 of FIG. 1.

The MTC device initiates a traffic call, at time $t_0$, to transmit and/or receive a burst of data traffic in a wireless network (e.g., wireless network 120 of FIG. 1). For example, to perform the traffic call, the MTC device may first exit a low-power idle state (e.g., or power-off state) and enter a "traffic" state. Upon entering the traffic state (e.g., at time $t_0$), the MTC device activates its primary antenna ANT_P and its diversity antenna ANT_D to communicate with a wireless hub (e.g., wireless hub 110 of FIG. 1) in a diversity communication mode. More specifically, the MTC device may transmit and/or receive wireless signals using the primary antenna ANT_P and diversity antenna ANT_D, concurrently, to perform traffic establishment (e.g., to request access to resources of the wireless network), from times $t_0$ to $t_1$, and to perform service negotiation (e.g., to negotiate the type of service to be provided for the MTC device), from times $t_1$ to $t_2$.

After the service negotiation process is completed, at time $t_2$, the MTC device may transmit and/or receive data traffic over the wireless channel (e.g., wireless network 120). At this time (e.g., time $t_2$), the MTC device may continue using its primary and diversity antennas ANT_P and ANT_D to communicate data traffic. While communicating data traffic, the MTC device may monitor one or more channel conditions of the wireless channel (e.g., based on a number of channel monitoring algorithms). The channel conditions may include factors such as noise, interference, channel fading, and/or other indicators of channel quality. More specifically, the MTC device may determine whether the channel conditions exceed a channel quality threshold for which communications may satisfactorily resume using only the primary antenna ANT_P.

If the MTC device determines that the channel conditions exceed a channel quality threshold (e.g., the algorithms "converge"), the MTC device may deactivate its diversity antenna ANT_D and continue communicating data traffic using only its primary antenna ANT_P. In the example of FIG. 2, the MTC device determines that the channel monitoring algorithms converge, at time $t_3$, and thus deactivates its diversity antenna ANT_D. The MTC device then completes the remainder of the traffic call, from times $t_3$ to $t_4$, using only the primary antenna ANT_P. Although not shown for simplicity in the example of FIG. 2, if the MTC device were to determine that the channel conditions do not exceed the channel quality threshold (e.g., the algorithms do not converge), the MTC device may continue using the diversity antenna ANT_D (e.g., together with the primary antenna ANT_P) to transmit and/or receive data traffic.

Conventional MTC devices are typically configured to operate in the diversity communication mode 102 each time a traffic call is initiated. As shown in FIG. 2, an MTC device may subsequently deactivate its diversity antenna (e.g., thus operating in the primary communication mode 101) if, after a period of time $T_{Div}$ (e.g., from times $t_0$ to $t_3$), the MTC device determines that the channel conditions are relatively good and/or stable (e.g., channel quality is at or above a threshold quality). However, in a conventional MTC device, the diversity antenna is typically reactivated at the start of the next traffic call (e.g., regardless of channel conditions). In this manner, conventional MTC devices spend at least a minimum period $T_{Div}$ operating in the diversity communication mode 102 during each traffic call.

As described above, operating in the diversity communication mode 102 may significantly drain an MTC device's limited energy resources. The example embodiments recognize that MTC devices, as well as wireless hubs, are often stationary devices (e.g., smart meters, security alarms, home appliances, etc.). Thus, the channel conditions between a stationary MTC device and a stationary wireless hub may change very little (if at all) between successive traffic calls. For example, if the channel conditions are sufficient to operate an MTC device in the primary communication mode 101 during an initial traffic call, it may be assumed that the channel conditions will remain sufficient for operating the MTC device in the primary communication mode 101 during a subsequent traffic call. Thus, in example embodiments, an MTC device may selectively activate (and/or deactivate) its diversity antenna(s) based at least in part on a prior state and/or usage of the diversity antenna(s).

Figure 3:
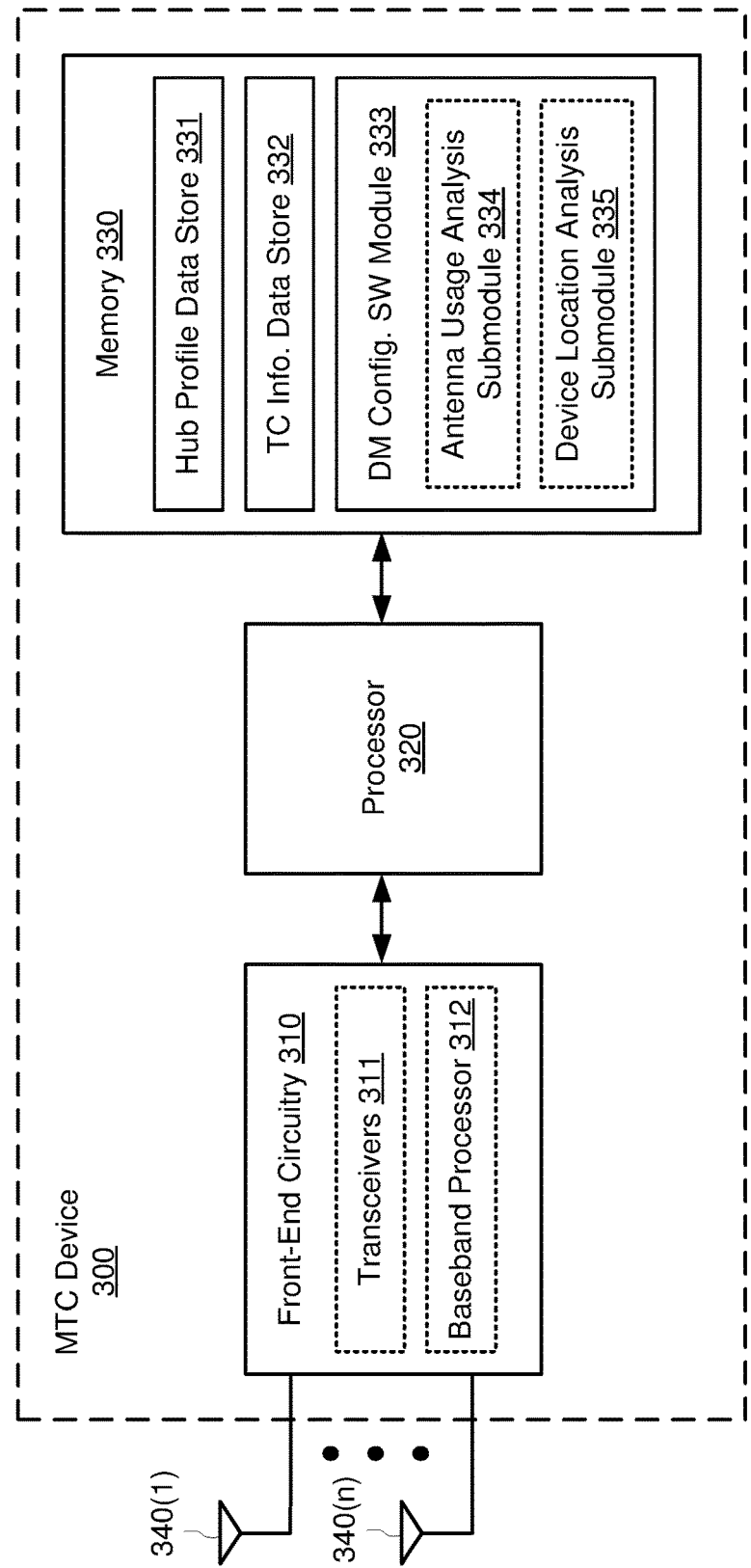
FIG. 3 shows an MTC device in accordance with example embodiments.

FIG. 3 shows an MTC device 300 in accordance with example embodiments. The MTC device 300 may be an embodiment of at least one of the client devices MTC1-MTC3 of FIG. 1. The MTC device 300 may include front-end circuitry 310 coupled to a number of antennas 340(1)-340(n), a processor 320, and a memory 330. For purposes of discussion herein, processor 320 is shown in FIG. 3 as being coupled between the front-end circuitry 310 and memory 330. For actual embodiments, the front-end circuitry 310, processor 320, and/or memory 330 may be connected together using one or more buses (not shown for simplicity).

The front-end circuitry 310 may include one or more transceivers 311 and a baseband processor 312. The transceivers 311 may be coupled to the antennas 340(1)-340(n), either directly or through an antenna selection circuit (not shown for simplicity). The transceivers 311 may be used to communicate wireless with one or more wireless hubs, MTC devices, and/or other suitable wireless devices. The baseband processor 312 may be used to process signals received form processor 320 and/or memory 330 and to forward the processed signals to transceivers 311 for transmission via one or more of the antennas 340(1)-340(n). The baseband processor 312 may also be used to process signals received from one or more of the antennas 340(1)-340(n) via transceivers 311 and to forward the processed signals to processor 320 and/or memory 330. In example embodiments, at least one of the antennas 340(1)-340(n) may be a primary antenna of the MTC device 300 and at least one of the antennas 340(1)-340(n) may be a diversity antenna (e.g., to be used only when operating the MTC device 300 in a diversity communication mode).

Memory 330 may include a hub profile data store 331 that stores profile information for a number of wireless hubs (e.g., access points and/or base stations), and a traffic call (TC) information data store 332 that stores information pertaining to one or more previously-executed traffic calls. The profile information stored in the hub profile data store 331 may include, for example, the MAC address of a particular wireless hub, supported data rates, performance metrics (e.g., link rate, average throughput, etc.), transmit power, and any other suitable information pertaining to or describing the operation of the wireless hub. The traffic call information stored in the TC information data store 332 may include, for example, usage information for one or more diversity antennas (e.g., whether the antennas were activated/deactivated and/or length or duration of activation/deactivation), location information for the MTC device 300 (e.g., geolocation, position, and/or distance of MTC device 300 when the traffic call was performed), and any other suitable information pertaining to or describing the previously-executed traffic calls.

Memory 330 may also include a non-transitory computer-readable medium (e.g., one or more nonvolatile memory elements, such as EPROM, EEPROM, Flash memory, a hard drive, and so on) that may store at least the following software (SW) modules:

a diversity mode (DM) configuration SW module 333 to selectively operate the MTC device 300 in a diversity communication mode based at least in part on a prior usage of the one or more diversity antennas;

an antenna usage analysis submodule 334 to determine whether the one or more diversity antennas were deactivated during a previous traffic call and/or whether the one or more diversity antennas remained deactivated for at least a threshold duration; and a device location analysis submodule 335 to determine whether the location of the MTC device 300 changed since the previous traffic call was performed.

Each software module includes instructions that, when executed by processor 320, causes the MTC device 300 to perform the corresponding functions. The non-transitory computer-readable medium of memory 330 thus includes instructions for performing all or a portion of the operations described below with respect to FIGS. 7-9.

Processor 320 may be any suitable one or more processors capable of executing scripts or instructions of one or more software programs stored in the MTC device 300 (e.g., within memory 330). For example, processor 320 may execute the DM configuration SW module 333 to selectively operate the MTC device 300 in a diversity communication mode based at least in part on a prior usage of the one or more diversity antennas. In executing the DM configuration SW module 333, the processor 320 may further execute the antenna usage analysis submodule 334 and/or the device location analysis submodule 335.

For example, processor 320 may execute the antenna usage analysis submodule 334 to determine whether the one or more diversity antennas were deactivated during a previous traffic call and/or whether the one or more diversity antennas remained deactivated for at least a threshold duration. In example embodiments, the processor 320, in executing the DM configuration SW module 333, may maintain the one or more diversity antennas in an inactive state (e.g., at the start of a traffic call) if the diversity antennas were deactivated during a previous traffic call and/or remained deactivated until completion of the previous traffic call. In other embodiments, the processor 320, in executing the DM configuration SW module 333, may maintain the one or more diversity antennas in an inactive state (e.g., at the start of a traffic call) if the diversity antennas were deactivated for at least a threshold duration of the previous traffic call.

Further, processor 320 may execute the device location analysis submodule 335 to determine whether the location of the MTC device 300 changed since the previous traffic call was performed. For example, the device location analysis submodule 335, as executed by processor 320, may detect changes in the location of the MTC device 300 using well-known geolocation and/or ranging techniques (e.g., based on RSSI information, GPS data, etc.). In example embodiments, the processor 320, in executing the DM configuration SW module 333, may activate the one or more diversity antennas (e.g., at the start of a traffic call) if the location of the MTC device 300 changed between a previous traffic call and the current traffic call.

FIGS. 4A and 4B show timing diagrams 400A and 400B, respectively, depicting traffic call operations for which an MTC device may selectively activate its diversity antenna based at least in part on prior usage of the diversity antenna, in accordance with example embodiments. For purposes of discussion herein, the MTC device represented in FIGS. 4A and 4B may be any one of the client devices MTC1-MTC3 of FIG. 1. More specifically, the MTC device may include at least a primary antenna (ANT_P) and a diversity antenna (ANT_D). In example embodiments, the MTC device may not activate its diversity antenna ANT_D, at the start of a traffic call, if the diversity antenna was deactivated during a previous traffic call and/or remained deactivated until completion of the previous traffic call.

With reference to FIG. 4A, the MTC device may initiate a first traffic call, at time $t_0$, to transmit and/or receive a burst of data traffic in a wireless network (e.g., wireless network 120 of FIG. 1). Upon entering the traffic state (e.g., at time $t_0$), the MTC device activates its primary antenna ANT_P and its diversity antenna ANT_D to communicate with the wireless network in a diversity communication mode (DM). For some embodiments, the MTC device may activate its primary antenna ANT_P and diversity antenna ANT_D after powering on (e.g., to establish a connection and/or communication session with the wireless network). For example, the MTC device may use the diversity antenna ANT_D, in combination with the primary antenna ANT_P, to improve its ability to establish a connection or communication session with the wireless network. Upon initiating the first traffic call (e.g., at time $t_0$), the MTC device may transmit and/or receive wireless signals using the primary antenna ANT_P and diversity antenna ANT_D, concurrently, to perform traffic establishment (TE) and service negotiation (SN), from times $t_0$ to $t_1$.

After the service negotiation process is completed (e.g., at time $t_1$), the MTC device may continue using the primary antenna ANT_P and diversity antenna ANT_D to transmit and/or receive data traffic over the wireless network. While communicating data traffic, the MTC device may monitor one or more channel conditions of the wireless channel (e.g., based on a number of channel monitoring algorithms). For example, the MTC device may determine whether the channel conditions exceed a channel quality threshold for which communications may be satisfactorily carried out using only the primary antenna ANT_P (e.g., indicated by convergence of the channel monitoring algorithms).

In the example of FIG. 4A, the MTC device determines that the channel conditions exceed the channel quality threshold (e.g., the channel monitoring algorithms converge (AC)), at time $t_2$. Accordingly, the MTC device deactivates its diversity antenna ANT_D (e.g., at time $t_2$) and thus disables the diversity communication mode. The MTC device then completes the remainder of the first traffic call (e.g., from times $t_2$ to $t_3$) using only the primary antenna ANT_P. Upon completing the first traffic call, at time $t_3$, the MTC device deactivates its primary antenna ANT_P and enters a low-power idle state.

Then, at time $t_4$, the MTC device exits the low-power idle state to initiate a second traffic call. Upon exiting the low-power idle state, the MTC device may determine whether its diversity antenna ANT_D was deactivated during a previous traffic call and/or remained deactivated until completion of the previous traffic call. For example, if the diversity antenna ANT_D was deactivated during the previous traffic call and/or remained deactivated until completion of the previous traffic call, the MTC device may assume that the current channel (CH) conditions in the wireless network are above a channel quality threshold (e.g., without executing the channel monitoring algorithms). More specifically, the example embodiments recognize that the channel conditions may remain relatively unchanged from the previous traffic call to the current traffic call.

In the example of FIG. 4A, the MTC device may determine that the diversity antenna ANT_D was deactivated during the first traffic call (e.g., at time $t_2$) and remained deactivated until completion of the first traffic call (e.g., at time $t_3$). Accordingly, the MTC device may assume that the channel conditions have remained satisfactory (e.g., to support communications using only the primary antenna ANT_P) since completion of the first traffic call (e.g., from times $t_3$ to $t_4$). Thus, in example embodiments, the MTC device may initiate the second traffic call, at time $t_4$, using only the primary antenna ANT_P (e.g., while maintaining the diversity antenna ANT_D in an inactive state). More specifically, the MTC device may perform the traffic establishment and service negotiation processes, from times $t_4$ to $t_5$, using only the primary antenna ANT_P.

After the service negotiation process is completed (e.g., at time $t_5$), the MTC device may continue to use only the primary antenna ANT_P to transmit and/or receive data traffic over the wireless network (e.g., from times $t_5$ to $t_6$). Upon completing the second traffic call, at time $t_6$, the MTC device deactivates its primary antenna and enters a low-power idle state. Further, because the diversity antenna ANT_D remained deactivated until completion of the second traffic call (e.g., at time $t_6$), the MTC device may continue to maintain the diversity antenna ANT_D in an inactive state when initiating a subsequent (e.g., third) traffic call (not shown for simplicity).

In the example of FIG. 4A, the MTC device initiates and completes the second traffic call without once activating (or reactivating) the diversity antenna ANT_D for the duration of the second traffic call (e.g., from times $t_4$ to $t_6$). As a result, the MTC device may achieve significant power savings over the duration of the second traffic call (e.g., compared to the first traffic call).

With reference to FIG. 4B, the MTC device may initiate a first traffic call, at time $t_0$, to transmit and/or receive a burst of data traffic in the wireless network. Upon entering the traffic state (e.g., at time $t_0$), the MTC device activates its primary antenna ANT_P and its diversity antenna ANT_D to communicate with the wireless network in a diversity communication mode. As described above, the MTC device may activate its primary antenna ANT_P and diversity antenna ANT_D after powering on (e.g., to establish a connection and/or communication session with the wireless network). Upon initiating the first traffic call (e.g., at time $t_0$), the MTC device may transmit and/or receive wireless signals using the primary antenna ANT_P and diversity antenna ANT_D, concurrently, to perform traffic establishment and service negotiation, from times $t_0$ to $t_1$.

After the service negotiation process is completed (e.g., at time $t_1$), the MTC device may continue using the primary antenna ANT_P and diversity antenna ANT_D to transmit and/or receive data traffic over the wireless network. While communicating data traffic, the MTC device may monitor one or more channel conditions of the wireless channel (e.g., based on a number of channel monitoring algorithms). As described above, the MTC device may determine whether the channel conditions exceed a channel quality threshold for which communications may be satisfactorily carried out using only the primary antenna ANT_P (e.g., indicated by convergence of the channel monitoring algorithms).

In the example of FIG. 4B, the MTC device determines that the channel conditions are below the channel quality threshold (e.g., the channel monitoring algorithms do not converge). Accordingly, the MTC device maintains its diversity antenna ANT_D in an active state for the remainder of the second traffic call (e.g., from times $t_1$ to $t_2$). For example, because the channel conditions are below the channel quality threshold, the MTC device may rely on the diversity antenna ANT_D to achieve a sufficient quality and/or throughput of communications in the wireless network. Upon completing the first traffic call, at time $t_2$, the MTC device deactivates its primary antenna ANT_P and diversity antenna ANT_D and enters a low-power idle state.

Then, at time $t_3$, the MTC device exits the low-power idle state to initiate a second traffic call. Upon exiting the low-power idle state, the MTC device may determine whether its diversity antenna ANT_D was deactivated during a previous traffic call and/or remained deactivated until completion of the previous traffic call. In the example of FIG. 4B, the MTC device may determine that the diversity antenna ANT_D remained active (e.g., was never deactivated) for the duration of the first traffic call (e.g., from times $t_0$ to $t_2$). Accordingly, the MTC device may assume that the current channel conditions are not satisfactory to support communications using only the primary antenna ANT_P. Thus, in example embodiments, the MTC device may reactivate its diversity antenna ANT_D, at time $t_3$, to initiate the second traffic call. More specifically, the MTC device may perform the traffic establishment and service negotiation processes, from times $t_3$ to $t_4$, using the primary antenna ANT_P and the diversity antenna ANT_D, concurrently.

After the service negotiation process is completed (e.g., at time $t_4$), the MTC device may continue using the primary antenna ANT_P and diversity antenna ANT_D to transmit and/or receive data traffic over the wireless network. While communicating data traffic, the MTC device may again monitor one or more channel conditions of the wireless channel (e.g., based on the channel monitoring algorithms). During the second traffic call, the MTC device may determine that the channel monitoring algorithms converge (AC), at time $t_5$. Accordingly, the MTC device deactivates its diversity antenna ANT_D and completes the remainder of the second traffic call (e.g., from times $t_5$ to $t_6$) using only the primary antenna ANT_P.

Upon completing the second traffic call, at time $t_6$, the MTC device deactivates its primary antenna ANT_P and enters a low-power idle state. Further, because the diversity antenna ANT_D remained deactivated until completion of the second traffic call (e.g., at time $t_6$), the MTC device may continue to maintain the diversity antenna ANT_D in an inactive state when initiating a subsequent (e.g., third) traffic call (not shown for simplicity).

Figure 5A:
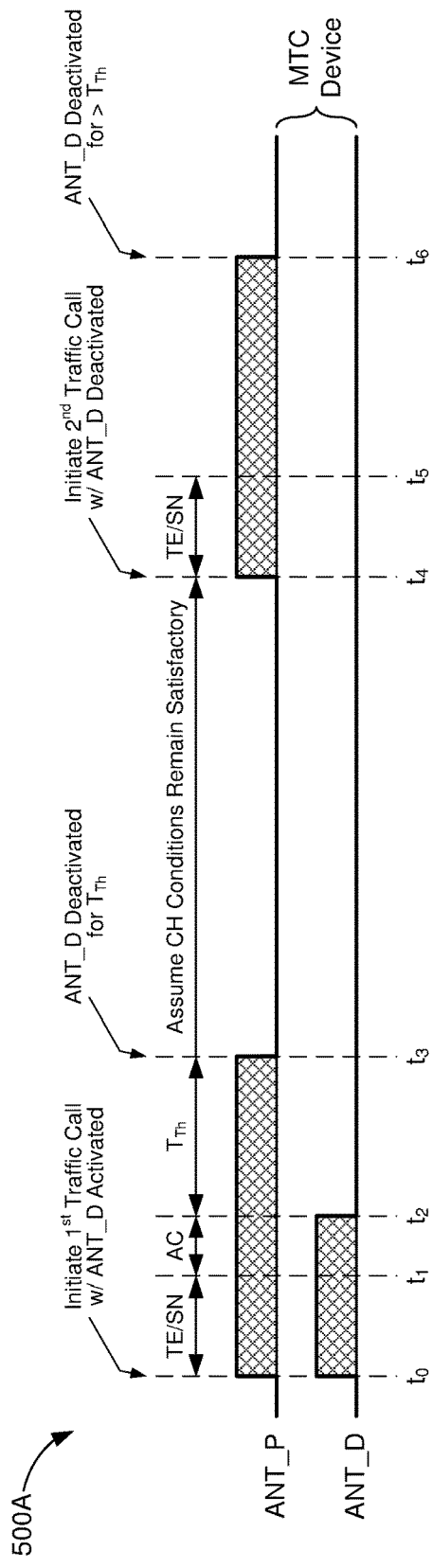
FIGS. 5A and 5B show timing diagrams depicting traffic call operations for which an MTC device may selectively activate its diversity antenna based at least in part on prior usage of the diversity antenna, in accordance with other embodiments.
Figure 5B:
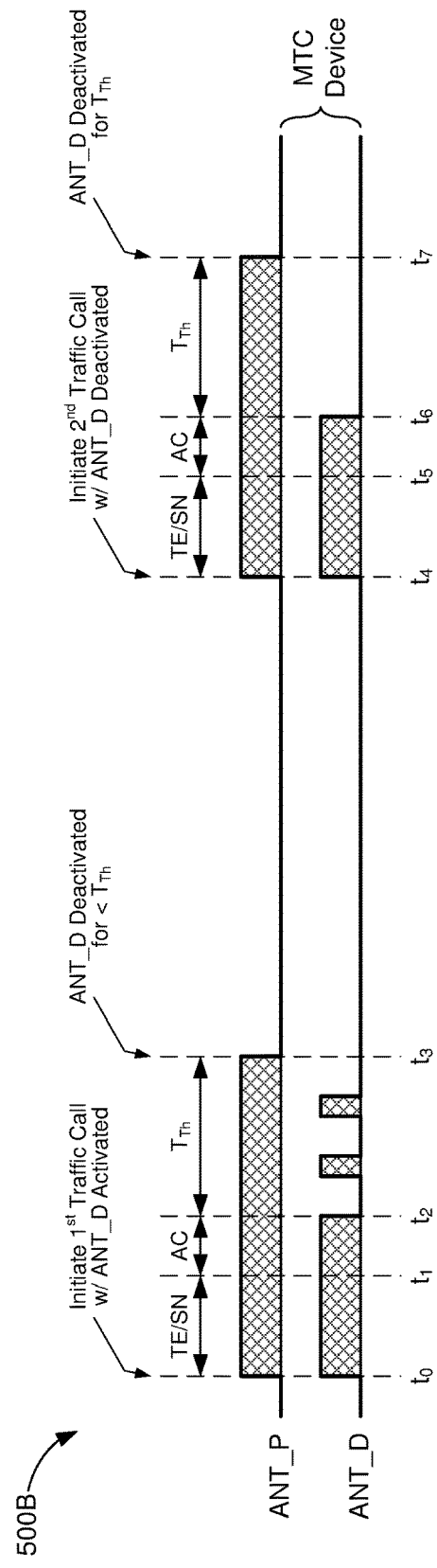

FIGS. 5A and 5B show timing diagrams 500A and 500B, respectively, depicting traffic call operations for which an MTC device may selectively activate its diversity antenna based at least in part on prior usage of the diversity antenna, in accordance with other embodiments. For purposes of discussion herein, the MTC device represented in FIGS. 5A and 5B may be any one of the client devices MTC1-MTC3 of FIG. 1. More specifically, the MTC device may include at least a primary antenna (ANT_P) and a diversity antenna (ANT_D). In example embodiments, the MTC device may not activate its diversity antenna ANT_D, at the start of a traffic call, if the diversity antenna was deactivated for at least a threshold duration of a previous traffic call.

With reference to FIG. 5A, the MTC device may initiate a first traffic call, at time $t_0$, to transmit and/or receive a burst of data traffic in the wireless network (e.g., wireless network 120 of FIG. 1). Upon entering the traffic state (e.g., at time $t_0$), the MTC device activates its primary antenna ANT_P and its diversity antenna ANT_D to communicate with the wireless network in a diversity communication mode. As described above, the MTC device may activate its primary antenna ANT_P and diversity antenna ANT_D after powering on (e.g., to establish a connection and/or communication session with the wireless network). Upon initiating the first traffic call (e.g., at time $t_0$), the MTC device may transmit and/or receive wireless signals using the primary antenna ANT_P and diversity antenna ANT_D, concurrently, to perform traffic establishment (TE) and service negotiation (SN), from times $t_0$ to $t_1$.

After the service negotiation process is completed (e.g., at time $t_1$), the MTC device may continue using its primary antenna ANT_P and diversity antenna ANT_D to transmit and/or receive data traffic over the wireless network. While communicating data traffic, the MTC device may monitor one or more channel conditions of the wireless channel (e.g., based on a number of channel monitoring algorithms). For example, the MTC device may determine whether the channel conditions exceed a channel quality threshold for which communications may be satisfactorily carried out using only the primary antenna ANT_P (e.g., indicated by convergence of the channel monitoring algorithms).

In the example of FIG. 5A, the MTC device determines that the channel conditions exceed the channel quality threshold (e.g., the channel monitoring algorithms converge (AC)), at time $t_2$. Accordingly, the MTC device deactivates its diversity antenna ANT_D (e.g., at time $t_2$) and thus disables the diversity communication mode. The MTC device then completes the remainder of the first traffic call (e.g., from times $t_2$ to $t_3$) using only the primary antenna ANT_P. Upon completing the first traffic call, at time $t_3$, the MTC device deactivates its primary antenna ANT_P and enters a low-power idle state.

Then, at time $t_4$, the MTC device exits the low-power idle state to initiate a second traffic call. Upon exiting the low-power idle state, the MTC device may determine whether its diversity antenna ANT_D was deactivated for at least a threshold duration of a previous traffic call. Alternatively, the MTC device may determine whether its diversity antenna ANT_D remained active for at least a threshold duration of the previous traffic call. For example, if the diversity antenna ANT_D was deactivated for at least the threshold duration of the previous traffic call (e.g., and/or remained active for less than a threshold duration), the MTC device may assume that the current channel (CH) conditions in the wireless network are above a channel quality threshold (e.g., without executing the channel monitoring algorithms). More specifically, the example embodiments recognize that the channel conditions may remain relatively unchanged from the previous traffic call to the current traffic call.

In the example of FIG. 5A, the MTC device may determine that the diversity antenna ANT_D was deactivated for at least a threshold duration ($T_{Th}$) during the first traffic call (e.g., from times $t_2$ to $t_3$). Accordingly, the MTC device may assume that the channel conditions have remained satisfactory (e.g., to support communications using only the primary antenna ANT_P) since completion of the first traffic call (e.g., from times $t_3$ to $t_4$). Thus, in example embodiments, the MTC device may initiate the second traffic call, at time $t_4$, using only the primary antenna ANT_P (e.g., while maintaining the diversity antenna ANT_D in an inactive state). More specifically, the MTC device may perform the traffic establishment and service negotiation processes, from times $t_4$ to $t_5$, using only the primary antenna ANT_P.

After the service negotiation process is completed (e.g., at time $t_5$), the MTC device may continue to use only the primary antenna ANT_P to transmit and/or receive data traffic over the wireless network (e.g., from times $t_5$ to $t_6$). Upon completing the second traffic call, at time $t_6$, the MTC device deactivates its primary antenna and enters a low-power idle state. Further, because the diversity antenna ANT_D remained deactivated for the duration of the second traffic call (e.g., which is greater than the threshold duration $T_{Th}$), the MTC device may continue to maintain the diversity antenna ANT_D in an inactive state when initiating a subsequent (e.g., third) traffic call (not shown for simplicity).

In the example of FIG. 5A, the MTC device initiates and completes the second traffic call without once activating (or reactivating) the diversity antenna ANT_D for the duration of the second traffic call (e.g., from times $t_4$ to $t_6$). As a result, the MTC device may achieve significant power savings over the duration of the second traffic call (e.g., compared to the first traffic call).

With reference to FIG. 5B, the MTC device may initiate a first traffic call, at time $t_0$, to transmit and/or receive a burst of data traffic in the wireless network. Upon entering the traffic state (e.g., at time $t_0$), the MTC device activates its primary antenna ANT_P and its diversity antenna ANT_D to communicate with the wireless network in a diversity communication mode. As described above, the MTC device may activate its primary antenna ANT_P and diversity antenna ANT_D after powering on (e.g., to establish a connection and/or communication session with the wireless network). Upon initiating the first traffic call (e.g., at time $t_0$), the MTC device may transmit and/or receive wireless signals using the primary antenna ANT_P and diversity antenna ANT_D, concurrently, to perform traffic establishment and service negotiation, from times $t_0$ to $t_1$.

After the service negotiation process is completed (e.g., at time t1), the MTC device may continue using the primary antenna ANT_P and diversity antenna ANT_D to transmit and/or receive data traffic over the wireless network. While communicating data traffic, the MTC device may monitor one or more channel conditions of the wireless channel (e.g., based on a number of channel monitoring algorithms). As described above, the MTC device may determine whether the channel conditions exceed a channel quality threshold for which communications may be satisfactorily carried out using only the primary antenna ANT_P (e.g., indicated by convergence of the channel monitoring algorithms).

In the example of FIG. 5B, the MTC device determines that the channel conditions exceed the channel quality threshold (e.g., the channel monitoring algorithms converge (AC)), at time $t_2$. Accordingly, the MTC device deactivates its diversity antenna ANT_D (e.g., at time $t_2$) and thus disables the diversity communication mode. However, the MTC device may continue monitoring the channel conditions (e.g., even after the diversity communication mode has been disabled) for the remainder of the traffic call (e.g., from times $t_2$ to $t_3$). In some aspects, the MTC device may reactivate the diversity antenna ANT_D if the channel conditions fall below the channel quality threshold (e.g., to improve communications with the wireless network). For example, as shown in FIG. 5B, the channel conditions may be relatively unstable (e.g., the channel conditions may fluctuate above and below the channel quality threshold), thus causing the MTC device to intermittently reactivate the diversity antenna ANT_D during the remainder of the first traffic call (e.g., from times $t_2$ to $t_3$). Upon completing the first traffic call, at time $t_3$, the MTC device deactivates its primary antenna ANT_P and diversity antenna ANT_D and enters a low-power idle state.

Then, at time $t_4$, the MTC device exits the low-power idle state to initiate a second traffic call. Upon exiting the low-power idle state, the MTC device may determine whether its diversity antenna ANT_D was deactivated for at least a threshold duration of a previous traffic call. Alternatively, the MTC device may determine whether its diversity antenna ANT_D remained active for at least a threshold duration of the previous traffic call. For example, if the diversity antenna ANT_D was not deactivated for at least the threshold duration of the previous traffic call (e.g., and/or remained active for at least a threshold duration), the MTC device may not assume that the current channel conditions are above the channel quality threshold.

In the example of FIG. 5B, the MTC device may determine that the diversity antenna ANT_D was not deactivated for at least the threshold duration $T_{Th}$ (e.g., since it was intermittently reactivated) during the first traffic call. Accordingly, the MTC device may assume that the current channel conditions are not satisfactory to support communications using only the primary antenna ANT_P. Thus, in example embodiments, the MTC device may reactivate its diversity antenna ANT_D, at time $t_4$, to initiate the second traffic call. More specifically, the MTC device may perform the traffic establishment and service negotiation processes, from times $t_4$ to $t_5$, using the primary antenna ANT_P and the diversity antenna ANT_D, concurrently.

After the service negotiation process is completed (e.g., at time $t_5$), the MTC device may continue using the primary antenna ANT_P and diversity antenna ANT_D to transmit and/or receive data traffic over the wireless network. While communicating data traffic, the MTC device may again monitor one or more channel conditions of the wireless channel (e.g., based on the channel monitoring algorithms). During the second traffic call, the MTC device may determine that the channel monitoring algorithms converge (AC), at time $t_6$. Accordingly, the MTC device deactivates its diversity antenna ANT_D and completes the remainder of the second traffic call (e.g., from times $t_6$ to $t_7$) using only the primary antenna ANT_P.

Upon completing the second traffic call, at time $t_7$, the MTC device deactivates its primary antenna ANT_P and enters a low-power idle state. Further, because the diversity antenna ANT_D remained deactivated for at least the threshold duration $T_{Th}$ (e.g., from times $t_6$ to $t_7$) during the second traffic call, the MTC device may continue to maintain the diversity antenna ANT_D in an inactive state when initiating a subsequent (e.g., third) traffic call (not shown for simplicity).

FIGS. 6A and 6B show timing diagrams 600A and 600B, respectively, depicting traffic call operations for which an MTC device may selectively activate its diversity antenna based at least in part on a location of the MTC device, in accordance with example embodiments. For purposes of discussion herein, the MTC device represented in FIGS. 6A and 6B may be any one of the client device MTC1-MTC3 of FIG. 1. More specifically, the MTC device may include at least a primary antenna (ANT_P) and a diversity antenna (ANT_D). In example embodiments, the MTC device may activate its diversity antenna ANT_D to initiate a traffic call when the location of the MTC device changes between the current traffic call and a previous traffic call.

With reference to FIG. 6A, the MTC device may initiate a first traffic call, at time $t_0$, to transmit and/or receive a burst of data traffic in the wireless network (e.g., wireless network 120 of FIG. 1). Upon entering the traffic state (e.g., at time $t_0$), the MTC device activates its primary antenna ANT_P and its diversity antenna ANT_D to communicate with the wireless network in a diversity communication mode. As described above, the MTC device may activate its primary antenna ANT_P and diversity antenna ANT_D after power on (e.g., to establish a connection and/or communication session with the wireless network). Upon initiating the first traffic call (e.g., at time $t_0$), the MTC device may transmit and/or receive wireless signals using the primary antenna ANT_P and diversity antenna ANT_D, concurrently, to perform traffic establishment (TE) and service negotiation (SN), from times $t_0$ to $t_1$.

After the service negotiation process is completed (e.g., at time $t_1$), the MTC device may continue using its primary antenna ANT_P and diversity antenna ANT_D to transmit and/or receive data traffic over the wireless network. While communicating the data traffic, the MTC device may monitor one or more channel conditions of the wireless channel (e.g., based on a number of channel monitoring algorithms). For example, the MTC device may determine whether the channel conditions exceed a channel quality threshold for which communications may be satisfactorily carried out using only the primary antenna ANT_P (e.g., as indicated by convergence of the channel monitoring algorithms).

In the example of FIG. 6A, the MTC device determines that the channel conditions exceed the channel quality threshold (e.g., the channel monitoring algorithms converge (AC)), at time $t_2$. Accordingly, the MTC device deactivates its diversity antenna ANT_D (e.g., at time $t_2$) and thus disables the diversity communication mode. The MTC device then completes the remainder of the first traffic call (e.g., from times $t_2$ to $t_3$) using only the primary antenna ANT_P. Upon completing the first traffic call, at time $t_3$, the MTC device deactivates its primary antenna ANT_P and enters a low-power idle state.

Then, at time $t_4$, the MTC device exits the low-power idle state to initiate a second traffic call. Upon exiting the low-power idle state, the MTC device may determine whether its location has changed since the completion of a previous traffic call. For example, if the location has not changed, the MTC device may assume that the current channel conditions have remained the same (e.g., or at least substantially unchanged) since the completion of the previous traffic call. Accordingly, the MTC device may selectively activate its diversity antenna ANT_D to initiate the second traffic call based on a prior usage and/or state of the diversity antenna ANT_D (e.g., as described above with respect to FIGS. 4A-4B and 5A-5B). However, if the location of the MTC device has changed, the MTC device may not assume that the current channel conditions are the same (e.g., since the completion of the previous traffic call).

In the example of FIG. 6A, the MTC device may determine that its location did not change since the first traffic call (e.g., between times $t_3$ to $t_4$). Further, the MTC device may determine that its diversity antenna ANT_D was deactivated during the first traffic call and remained deactivated (e.g., for a threshold duration $T_{Th}$) until completion of the first traffic call (e.g., from times $t_2$ to $t_3$). Accordingly, the MTC device may assume that the channel conditions have remained satisfactory (e.g., to support communications using only the primary antenna ANT_P) since completion of the first traffic call (e.g., from times $t_3$ to $t_4$). Thus, in example embodiments, the MTC device may initiate the second traffic call, at time $t_4$, using only the primary antenna ANT_P (e.g., while maintaining the diversity antenna ANT_D in an inactive state). More specifically, the MTC device may perform the traffic establishment and service negotiation processes, from times $t_4$ to $t_5$, and complete the second traffic call, at time $t_6$, using only the primary antenna ANT_P.

If, at time $t_3$, the MTC device determines that its location has changed since the first traffic call, the MTC device may activate its diversity antenna ANT_D to initiate the second traffic call (e.g., regardless of the prior usage and/or state of the diversity antenna ANT_D). For example, as shown in FIG. 6B, the MTC device may determine that its location has changed prior to initiating the second traffic call, at time $t_4$. Accordingly, the MTC device may activate its diversity antenna ANT_D to initiate the second traffic call (e.g., at time $t_4$) even though the diversity antenna ANT_D was deactivated during the first traffic call and remained deactivated (e.g., for a threshold duration $T_{Th}$) until completion of the first traffic call (e.g., from times $t_2$ to $t_3$).

In the example of FIG. 6B, the MTC device may perform the traffic establishment and service negotiation processes, from times $t_4$ to $t_5$, using the primary antenna ANT_P and diversity antenna ANT_D, concurrently. After the service negotiation process is completed (e.g., at time $t_5$), the MTC device may continue using the primary antenna ANT_P and diversity antenna ANT_D to transmit and/or receive data traffic over the wireless network. While communicating data traffic, the MTC device may again monitor one or more channel conditions of the wireless channel (e.g., based on the channel monitoring algorithms). During the second traffic call, the MTC device may determine that the channel monitoring algorithms converge (AC), at time $t_6$. Accordingly, the MTC device deactivates its diversity antenna ANT_D and completes the remainder of the second traffic call (e.g., from times $t_6$ to $t_7$) using only the primary antenna ANT_P.

Upon completing the second traffic call, at time $t_7$, the MTC device deactivates its primary antenna ANT_P and enters a low-power idle state. Further, because the diversity antenna ANT_D was deactivated during the second traffic call and remained deactivated (e.g., for at least the threshold duration $T_{Th}$) until completion of the second traffic call (e.g., from times $t_6$ to $t_7$), the MTC device may continue to maintain the diversity antenna ANT_D in an inactive state when initiating a subsequent (e.g., third) traffic call (not shown for simplicity) as long as the location of the MTC device does not change between the completion of the second traffic call (e.g., at time $t_7$) and the initiation of the subsequent traffic call.

Figure 7:
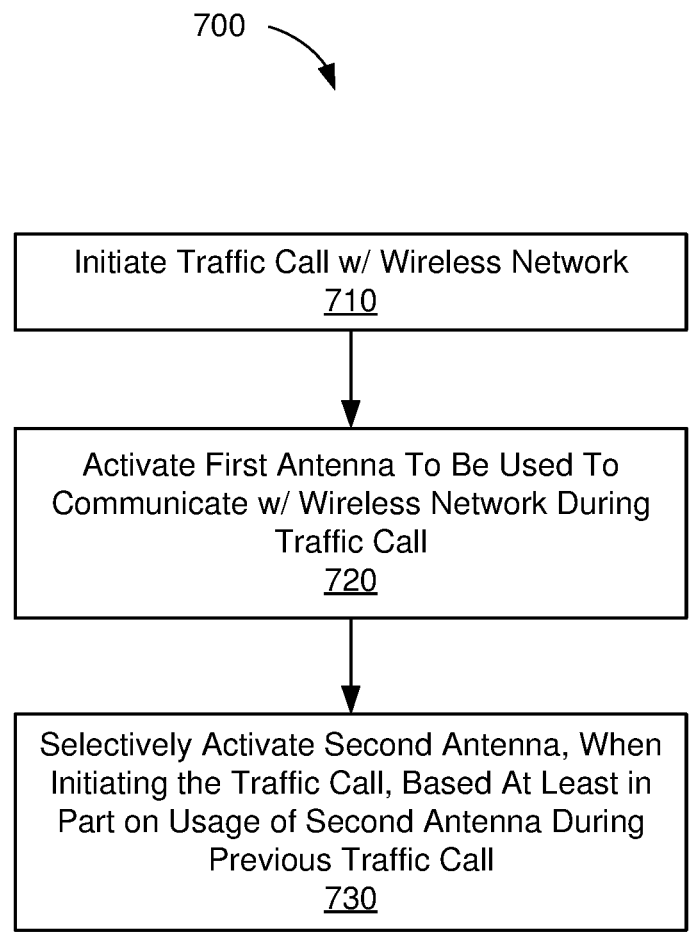
FIG. 7 shows a flowchart depicting an example traffic call operation for which an MTC device may selectively activate its diversity antenna based at least in part on prior usage of the diversity antenna.

FIG. 7 shows a flowchart depicting an example traffic call operation 700 for which an MTC device may selectively activate its diversity antenna based at least in part on prior usage of the diversity antenna. With reference for example to FIG. 1, the operation 700 may be implemented by one or more of the client devices MTC1-MTC3 to reduce power consumption when initiating traffic calls in the wireless network 120.

The MTC device may first initiate a traffic call with the wireless network (710). For example, the MTC device may initiate the traffic call to transmit and/or receive a burst of data traffic via the wireless network. As described above, the MTC device may be a battery-operated device that communicates infrequently with a corresponding wireless network. More specifically, the MTC device may remain idle for relatively long periods of time between bursts of data traffic (e.g., to conserve energy). Thus, to initiate a traffic call, the MTC device may first wake up from a low-power idle state (e.g., or power-off state) and enter a traffic state.

When entering the traffic state, the MTC device activates a first antenna to be used to communicate with the wireless network during the traffic call (720). For example, the first antenna may correspond to a primary antenna of the MTC device. As described above, any data traffic to and/or from the MTC device is communicated using at least the primary antenna. When operating in a primary communication mode, the MTC device uses only its primary antenna to transmit and/or receive wireless signals in the wireless network.

Further, the MTC device may selectively activate a second antenna, when initiating the traffic call, based at least in part on a usage of the second antenna during a previous traffic call (730). For example, the second antenna may correspond to a diversity antenna of the MTC device. The diversity antenna may be used to improve signal quality and/or throughput of communications for the MTC device (e.g., under poor or unreliable channel conditions). When operating in a diversity communication mode, the MTC device may use the primary antenna and the diversity antenna, concurrently, to transmit and/or receive wireless signals in the wireless network.

As described above, operating in the diversity communication mode may significantly drain the MTC device's limited energy resources. The example embodiments recognize that, because MTC devices are often stationary, their respective channel conditions may change very little (if at all) between successive traffic calls. Thus, for some embodiments, the MTC device may maintain the second antenna in an inactive state (e.g., when initiating the traffic call) if the second antenna was deactivated during a previous traffic call and/or remained deactivated for until completion of the previous traffic call. In other embodiments, the MTC device may maintain the second antenna in an inactive state (e.g., when initiating the traffic call) if the second antenna was deactivated for at least a threshold duration of the previous traffic cal. Still further, for some embodiments, the MTC device may activate the second antenna (e.g., regardless of the prior usage and/or state of the second antenna) if the location of the MTC device changed between the previous traffic call and the current traffic call.

Figure 8:
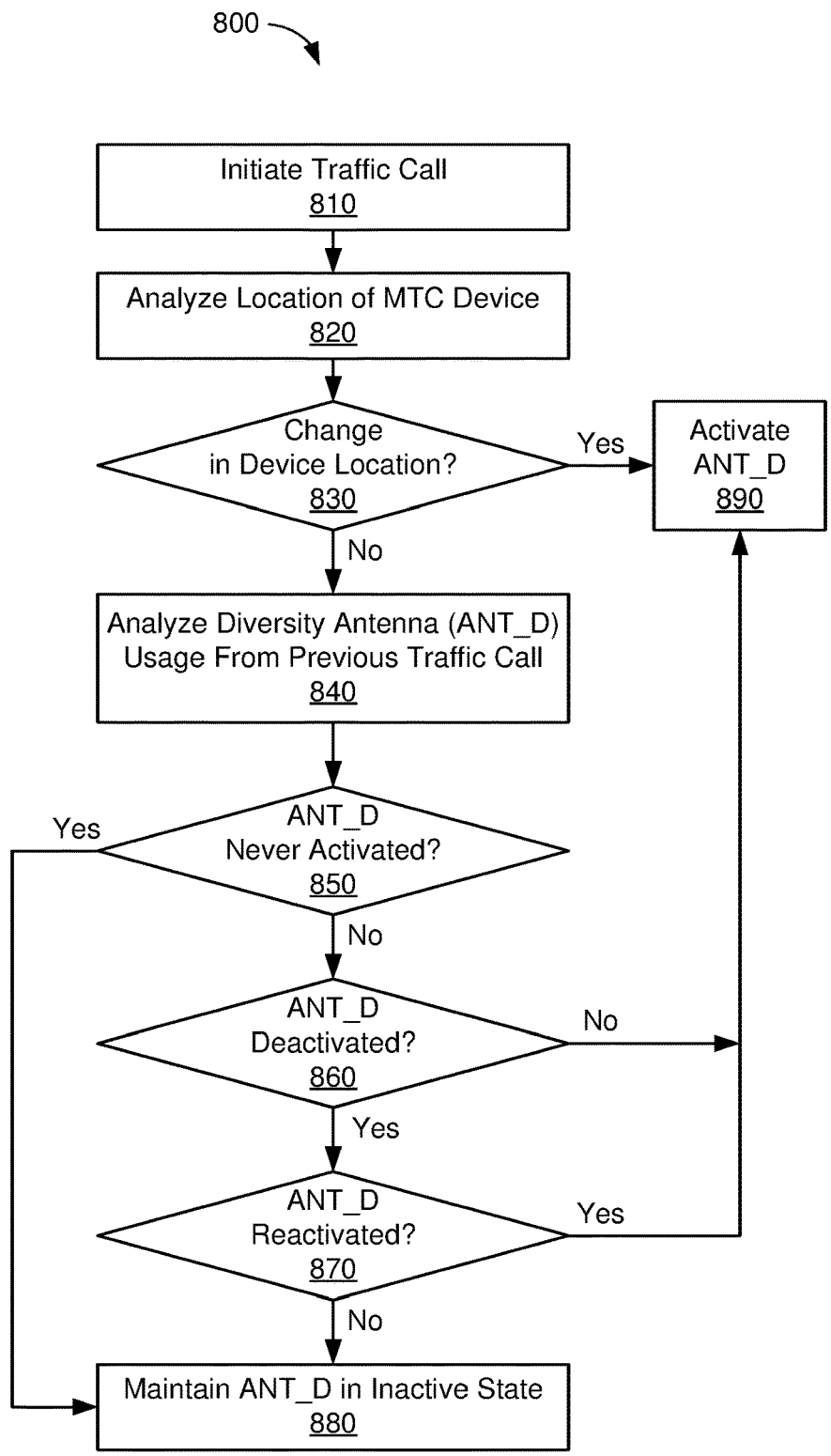
FIG. 8 shows a flowchart depicting a traffic call operation for which an MTC device may selectively activate its diversity antenna, in accordance with example embodiments.

FIG. 8 shows a flowchart depicting a traffic call operation 800 for which an MTC device may selectively activate its diversity antenna, in accordance with example embodiments. With reference for example to FIG. 1, the operation 800 may be implemented by one or more of the client devices MTC1-MTC3 to reduce power consumption when initiating traffic calls in the wireless network 120. More specifically, the MTC device may include at least a primary antenna (ANT_P) and a diversity antenna (ANT_D).

The MTC device may first initiate a traffic call with the wireless network (810). For example, the MTC device may initiate the traffic call to transmit and/or receive a burst of data traffic via the wireless network. To initiate the traffic call, the MTC device may first wake up from a low-power idle state (e.g., or power-off state) and enter a traffic state.

When entering the traffic state, the MTC device may analyze a location of the MTC device (820). As described above with respect to FIGS. 6A-6B, the MTC device may determine whether its location has changed since the completion of a previous traffic call (830). For example, if the location has not changed, the MTC device may assume that the current channel conditions have remained the same (e.g., or at least substantially unchanged) since the completion of the previous traffic call. However, if the location of the MTC device has changed, the MTC device may not assume that the current channel conditions are the same (e.g., since the completion of the previous traffic call).

Thus, if the MTC device detects a change in its location (as tested at 830), the MTC device may activate its diversity antenna (890) to perform the current traffic call. In example embodiments, if the location of the MTC device changed (e.g., between the previous traffic call and the current traffic call), the MTC device may activate its diversity antenna regardless of the prior usage and/or state of the diversity antenna (e.g., as described above with respect to FIG. 6B). For example, due to the relatively unknown channel conditions, the MTC device may activate its diversity antenna to improve the signal quality and/or throughput of communications when initiating the traffic call.

However, if the MTC device does not detect a change in its location (as tested at 830), the MTC device may then analyze a usage of its diversity antenna from a previous traffic call (840). As described above, the example embodiments recognize that the channel conditions may remain relatively unchanged (e.g., from a previous traffic call to the current traffic call) if the location of the MTC device does not change. Thus, as long as the location of the MTC device does not change, the MTC device may selectively activate its diversity antenna based on a prior usage and/or state of the diversity antenna (e.g., as described above with respect to FIG. 6A).

For example, the MTC device may determine whether the diversity antenna was inactive (e.g., never activated) for the duration of the previous traffic call (850). Maintaining the diversity antenna in an inactive state may suggest satisfactory channel conditions (e.g., to support communications using only the primary antenna). Thus, if the diversity antenna was never activated for the duration of the previous traffic call (as tested at 850), the MTC device may maintain the diversity antenna in the inactive state (880) when performing the current traffic call (e.g., as described above with respect to FIGS. 4A and 5A).

If the diversity antenna was activated for at least a period of the previous traffic call (as tested at 850), the MTC device may then determine whether the diversity antenna was ever deactivated during the previous traffic call (860). Maintaining the diversity antenna in an active state may suggest poor channel conditions (e.g., not sufficient for communications using only the primary antenna). Thus, if the diversity antenna was never deactivated during the previous traffic call (as tested at 860), the MTC device may activate the diversity antenna (890) to perform the current traffic call (e.g., as described above with respect to FIG. 4B).

If the diversity antenna was deactivated at least once during the previous traffic call (as tested at 860), the MTC device may then determine whether the diversity antenna was ever reactivated for the remainder of the previous traffic call (870). Reactivating the diversity antenna may suggest unstable or unreliable channel conditions. Thus, if the diversity antenna was reactivated prior to completing the previous traffic call (as tested at 870), the MTC device may activate the diversity antenna (890) to perform the current traffic call (e.g., as described above with respect to FIG. 5B).

However, if the diversity antenna was deactivated (as tested at 860) and never reactivated (as tested at 870) for the remainder of the previous traffic call, the MTC device may maintain the diversity antenna in the inactive state (880) when performing the current traffic call (e.g., as described above with respect to FIGS. 4A and 5A).

Figure 9:
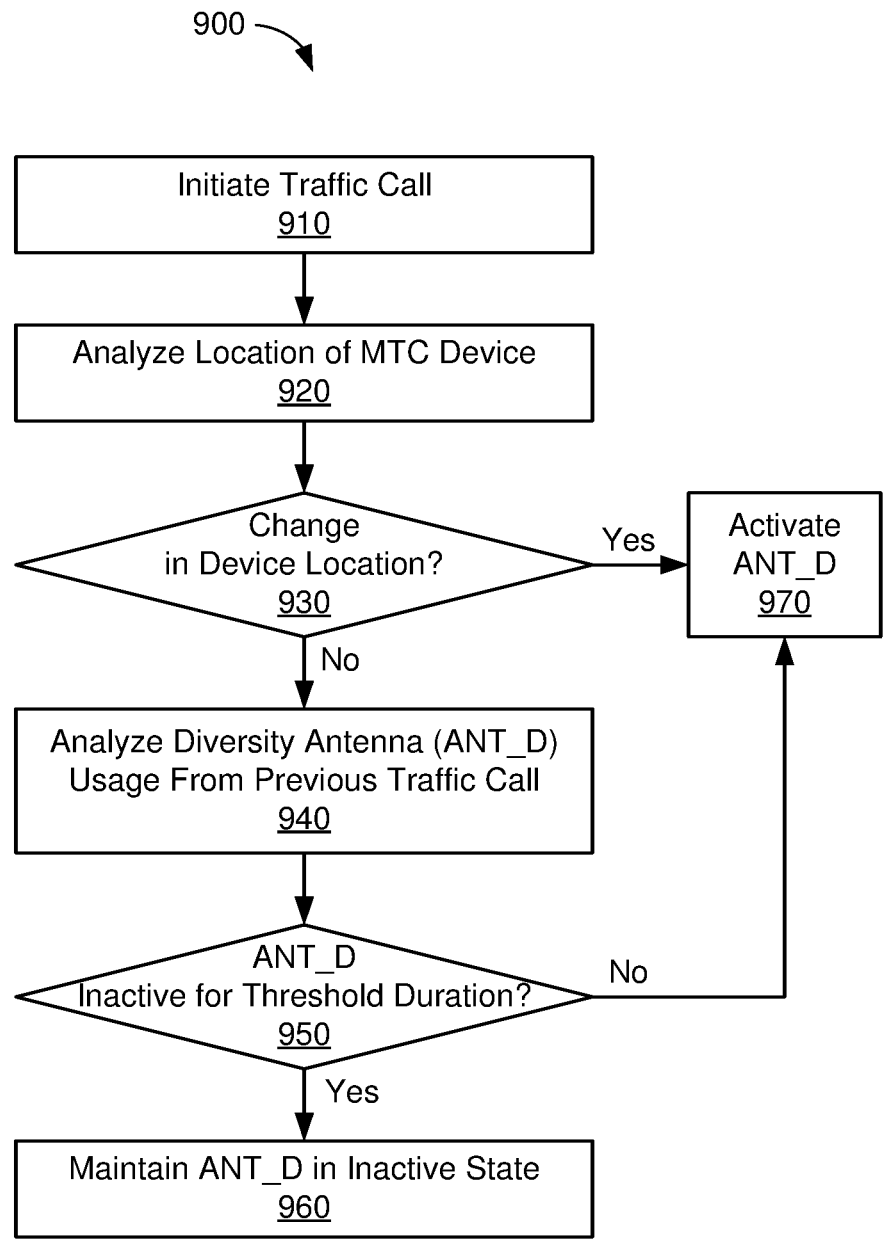
FIG. 9 shows a flowchart depicting a traffic call operation for which an MTC device may selectively activate its diversity antenna, in accordance with other embodiments.

FIG. 9 shows a flowchart depicting a traffic call operation 900 for which an MTC device may selectively activate its diversity antenna, in accordance with other embodiments. With reference for example to FIG. 1, the operation 900 may be implemented by one or more of the client devices MTC1-MTC3 to reduce power consumption when initiating traffic calls in the wireless network 120. More specifically, the MTC device may include at least a primary antenna (ANT_P) and a diversity antenna (ANT_D).

The MTC device may first initiate a traffic call with the wireless network (910). For example, the MTC device may initiate the traffic call to transmit and/or receive a burst of data traffic via the wireless network. To initiate the traffic call, the MTC device may first wake up from a low-power idle state (e.g., or power-off state) and enter a traffic state.

When entering the traffic state, the MTC device may analyze a location of the MTC device (920). As described above with respect to FIGS. 6A-6B, the MTC device may determine whether its location has changed since the completion of a previous traffic call (930). For example, if the location has not changed, the MTC device may assume that the current channel conditions have remained the same (e.g., or at least substantially unchanged) since the completion of the previous traffic call. However, if the location of the MTC device has changed, the MTC device may not assume that the current channel conditions are the same (e.g., since the completion of the previous traffic call).

Thus, if the MTC device detects a change in its location (as tested at 930), the MTC device may activate its diversity antenna (970) to perform the current traffic call. In example embodiments, if the location of the MTC device changed (e.g., between the previous traffic call and the current traffic call), the MTC device may activate its diversity antenna regardless of the prior usage and/or state of the diversity antenna (e.g., as described above with respect to FIG. 6B). For example, due to the relatively unknown channel conditions, the MTC device may activate its diversity antenna to improve the signal quality and/or throughput of communications when initiating the traffic call.

However, if the MTC device does not detect a change in its location (as tested at 930), the MTC device may then analyze a usage of its diversity antenna from a previous traffic call (940). As described above, the example embodiments recognize that the channel conditions may remain relatively unchanged (e.g., from a previous traffic call to the current traffic call) if the location of the MTC device does not change. Thus, as long as the location of the MTC device does not change, the MTC device may selectively activate its diversity antenna based on a prior usage and/or state of the diversity antenna (e.g., as described above with respect to FIG. 6A).

For example, the MTC device may determine whether the diversity antenna was inactive (e.g., or remained inactive) for at least a threshold duration of the previous traffic call (950). Alternatively, or in addition, the MTC device may determine whether the diversity antenna was active for at least a threshold duration of the previous traffic call. As described above, maintaining the diversity antenna in an inactive state for at least the threshold duration may suggest satisfactory channel conditions (e.g., to support communications using only the primary antenna). On the other hand, failure to maintain the diversity antenna in the inactive state for at least the threshold duration (e.g., and/or maintaining the diversity antenna in an active state for a threshold duration) may suggest poor and/or unreliable channel conditions.

Thus, if the diversity antenna was inactive for at least the threshold duration (as tested at 950), the MTC device may maintain the diversity antenna in the inactive state (960) when performing the current traffic call (e.g., as described above with respect to FIG. 5A). However, if the diversity antenna did not remain inactive for at least the threshold duration (as tested at 950), the MTC device may activate the diversity antenna (970) to perform the current traffic call (e.g., as described above with respect to FIG. 5B).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific examples. It will, however, be evident that various modifications and changes may be made thereto without departing from the broader scope of the disclosure as set forth in the appended claims. For example, the method steps depicted in the flow charts of FIGS. 6 and 7 may be performed in other suitable orders, multiple steps may be combined into a single step, and/or some steps may be omitted (or further steps included). The specification and drawings are, accordingly, to be regarded in an illustrative sense rather than a restrictive sense.

What is claimed is:

1. A method of operating a wireless device, the method comprising:
    initiating a traffic call with a wireless network;
    activating a first antenna of the wireless device to be used to communicate with the wireless network upon initiating the traffic call; and
    selectively activating a second antenna of the wireless device, when initiating the traffic call, based at least in part on a usage of the second antenna during a previous traffic call, wherein the selectively activating comprises activating the second antenna if the second antenna was active during the previous traffic call for at least a threshold duration.

2. The method of claim 1, wherein the wireless device is a machine-type communication (MTC) device.

3. The method of claim 1, further comprising:
    upon activating the second antenna, communicating with the wireless network using the first antenna and the second antenna, concurrently, during the traffic call.

4. The method of claim 1, wherein the selectively activating comprises:
    maintaining the second antenna in an inactive state if the second antenna was never activated during the previous traffic call.

5. The method of claim 1, wherein the selectively activating comprises:
    maintaining the second antenna in an inactive state if the second antenna was deactivated during the previous traffic call.

6. The method of claim 1, wherein the selectively activating comprises:
    maintaining the second antenna in an inactive state if the second antenna was deactivated during the previous traffic call and remained inactive for the remainder of the previous traffic call.

7. The method of claim 1, wherein the selectively activating comprises:
    maintaining the second antenna in an inactive state if the second antenna was inactive for at least a threshold duration of the previous traffic call.

8. The method of claim 1, wherein the selectively activating comprises:
    determining a location of the wireless device; and
    selectively activating the second antenna based at least in part on the location of the wireless device.

9. The method of claim 8, wherein the selectively activating further comprises:
    activating the second antenna if the location of the wireless device changed between the traffic call and the previous traffic call.

10. A wireless device comprising:
    a first antenna;
    a second antenna;
    one or more processors; and
    a memory storing instructions that, when executed by the one or more processors, cause the wireless device to:
        initiate a traffic call with a wireless network;
        activate the first antenna to be used to communicate with the wireless network upon initiating the traffic call; and
        selectively activate the second antenna, when initiating the traffic call, based at least in part on a usage of the second antenna during a previous traffic call, wherein execution of the instructions to selectively activate the second antenna causes the wireless device to:
            activate the second antenna if the second antenna was active during the previous traffic call for at least a threshold duration.

11. The wireless device of claim 10, wherein execution of the instructions to selectively activate the second antenna causes the wireless device to:
    maintain the second antenna in an inactive state if the second antenna was never activated during the previous traffic call.

12. The wireless device of claim 10, wherein execution of the instructions to selectively activate the second antenna causes the wireless device to:
    maintain the second antenna in an inactive state if the second antenna was deactivated during the previous traffic call.

13. The wireless device of claim 10, wherein execution of the instructions to selectively activate the second antenna causes the wireless device to:
    maintain the second antenna in an inactive state if the second antenna was deactivated during the previous traffic call and remained inactive for the remainder of the previous traffic call.

14. The wireless device of claim 10, wherein execution of the instructions to selectively activate the second antenna causes the wireless device to:
    maintain the second antenna in an inactive state if the second antenna was inactive for at least a threshold duration of the previous traffic call.

15. The wireless device of claim 10, wherein execution of the instructions to selectively activate the second antenna causes the wireless device to:
    determine a location of the wireless device; and
    selectively activate the second antenna based at least in part on the location of the wireless device.

16. The wireless device of claim 10, wherein execution of the instructions to selectively activate the second antenna further causes the wireless device to:
    activate the second antenna if the location of the wireless devices changed between the traffic call and the previous traffic call.

17. A wireless device, comprising:
    means for initiating a traffic call with a wireless network;

means for activating a first antenna of the wireless device to be used to communicate with the wireless network upon initiating the traffic call; and means for selectively activating a second antenna of the wireless device, when initiating the traffic call, based at least in part on a usage of the second antenna during a previous traffic call, wherein the means for selectively activating comprises means for activating the second antenna if the second antenna was active during the previous traffic call for at least a threshold duration.

18. The wireless device of claim 17, wherein the means for selectively activating the second antenna is to:
maintain the second antenna in an inactive state if the second antenna was never activated during the previous traffic call.

19. The wireless device of claim 17, wherein the means for selectively activating the second antenna is to:
maintain the second antenna in an inactive state if the second antenna was deactivated during the previous traffic call.

20. The wireless device of claim 17, wherein the means for selectively activating the second antenna is to:
maintain the second antenna in an inactive state if the second antenna was deactivated during the previous traffic call and remained inactive for the remainder of the previous traffic call.

21. The wireless device of claim 17, wherein the means for selectively activating the second antenna is to:
maintain the second antenna in an inactive state if the second antenna was inactive during the previous traffic call for at least a threshold duration.

22. The wireless device of claim 17, wherein the means for selectively activating the second antenna is to:
activate the second antenna if a location of the wireless device changed between the traffic call and the previous traffic call.

23. A non-transitory computer-readable medium storing instructions that, when executed by one or more processors of a wireless device, cause the wireless device to:
initiate a traffic call with a wireless network;
activate a first antenna of the wireless device to be used to communicate with the wireless network upon initiating the traffic call; and
selectively activate a second antenna of the wireless device, when initiating the traffic call, based at least in part on a usage of the second antenna during a previous traffic call, wherein the selectively activate comprises activate the second antenna if the second antenna was active during the previous traffic call for at least a threshold duration.

24. The non-transitory computer-readable medium of claim 23, wherein execution of the instructions to selectively activate the second antenna causes the wireless device to:
maintain the second antenna in an inactive state if the second antenna was never activated during the previous traffic call.

25. The non-transitory computer-readable medium of claim 23, wherein execution of the instructions to selectively activate the second antenna causes the wireless device to:
maintain the second antenna in an inactive state if the second antenna was deactivated during the previous traffic call.

26. The non-transitory computer-readable medium of claim 23, wherein execution of the instructions to selectively activate the second antenna causes the wireless device to:
maintain the second antenna in an inactive state if the second antenna was deactivated during the previous traffic call and remained inactive for the remainder of the previous traffic call.

27. The non-transitory computer-readable medium of claim 23, wherein execution of the instructions to selectively activate the second antenna causes the wireless device to:
maintain the second antenna in an inactive state if the second antenna was inactive during the previous traffic call for at least a threshold duration.

28. The non-transitory computer-readable medium of claim 23, wherein execution of the instructions to selectively activate the second antenna causes the wireless device to:
activate the second antenna if a location of the wireless device changed between the traffic call and the previous traffic call.

* * * * *